US007188768B1

(12) United States Patent
Rozumek et al.

(10) Patent No.: US 7,188,768 B1
(45) Date of Patent: Mar. 13, 2007

(54) PRINTING INK, USE OF MICRO-WIRES AS ANTENNAS IN SECURITY DOCUMENTS, METHOD FOR PRODUCING A SECURITY DOCUMENT AND METHODS FOR AUTHENTICATION OF SECURITY DOCUMENTS

(75) Inventors: Olivier Rozumek, St. Martin (CH); Edgar Müller, Fribourg (CH)

(73) Assignee: SICPA Holding S.A., Prilly (CH)

( * ) Notice: Subject to any disclaimer, the term of this patent is extended or adjusted under 35 U.S.C. 154(b) by 628 days.

(21) Appl. No.: 10/129,106

(22) PCT Filed: Sep. 27, 2000

(86) PCT No.: PCT/EP00/09429

§ 371 (c)(1),
(2), (4) Date: Jul. 12, 2002

(87) PCT Pub. No.: WO01/39135

PCT Pub. Date: May 31, 2001

(30) Foreign Application Priority Data

Nov. 25, 1999 (EP) .................................. 99123501
Dec. 27, 1999 (EP) .................................. 99126007

(51) Int. Cl.
*G06K 7/00* (2006.01)

(52) U.S. Cl. ........................ 235/440; 235/449; 235/493
(58) Field of Classification Search ................ 235/494, 235/492, 487, 449, 440, 493
See application file for complete search history.

(56) References Cited

U.S. PATENT DOCUMENTS

| 4,443,495 A | 4/1984 | Morgan et al. |
| 4,820,912 A | 4/1989 | Samyn |
| 5,204,681 A | 4/1993 | Greene |
| 5,291,205 A | 3/1994 | Greene |
| 5,581,257 A | 12/1996 | Greene et al. |
| 5,690,774 A | 11/1997 | Greene |

FOREIGN PATENT DOCUMENTS

| DE | 2919158 | 11/1980 |
| EP | 605650 | 7/1994 |
| EP | 744720 | 11/1996 |
| EP | 845754 | 6/1998 |
| GB | 2050664 | 1/1981 |
| JP | 08-194790 | 7/1996 |

*Primary Examiner*—Karl D. Frech
(74) *Attorney, Agent, or Firm*—Showmaker and Mattare

(57) ABSTRACT

The present invention relates to a printing ink comprising at least one film forming binder and plurality of at least one type of electrically conductive micro-wires wherein the mean length of said type of micro-wires is in a range of between 3 μm to 250 μm.

18 Claims, 3 Drawing Sheets

Figure 1A:
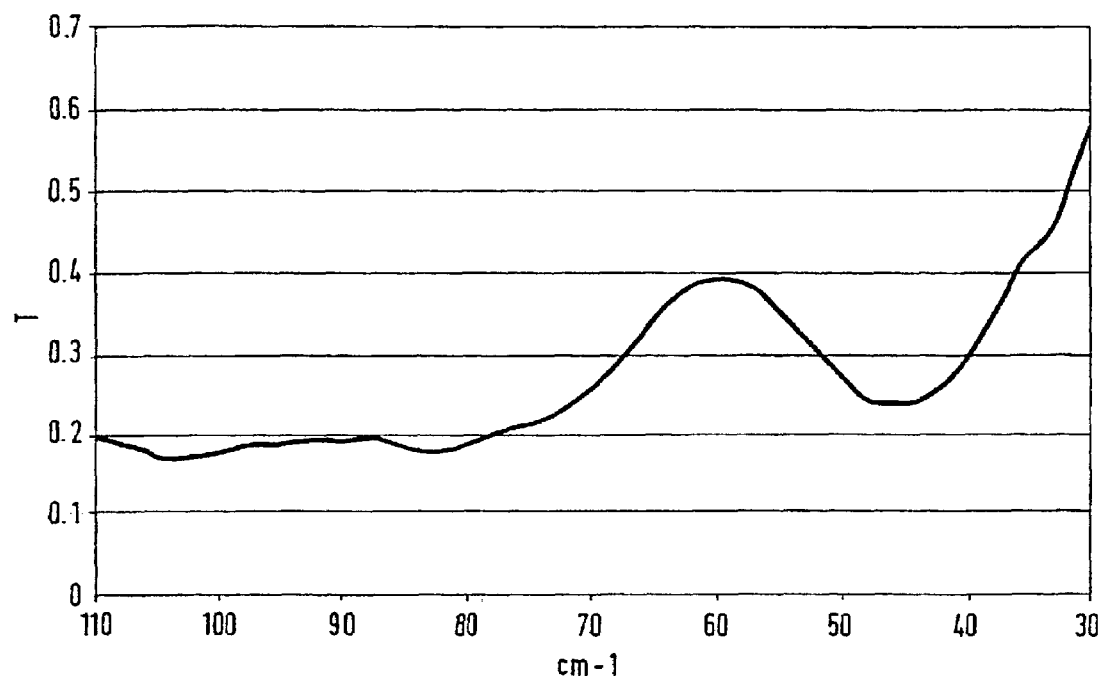

PRINTING INK, USE OF MICRO-WIRES AS ANTENNAS IN SECURITY DOCUMENTS, METHOD FOR PRODUCING A SECURITY DOCUMENT AND METHODS FOR AUTHENTICATION OF SECURITY DOCUMENTS

The present invention relates to a printing ink comprising a plurality of at least one type of micro-wires, a document comprising a marking, the use of micro-wires as antennas in markings on security documents, a method for producing a security document and to methods for authentication of a security document according to the preambles of the independent claims.

Ink and coating compositions containing micro-wires are well known and have been described mainly for product security applications.

GB 2 050 664 and U.S. Pat. No. 5,682,103 teach the incorporation of stainless steel fibres or threads in base materials of paper and plastic. GB 2 050 644 exploits the dipole antenna properties of the micro-wires in the base material for detection purposes. U.S. Pat. No. 5,682,103 deals with the advanced problem of misrecognition between security documents comprising stainless steel fibres in their volume and those the surface of which is partially covered with metal foil or parts of a thin metal film. By providing an apparatus which comprises means for emitting and receiving near infrared waves and preferably means for emitting and receiving microwaves and irradiating the documents therewith differentiation is possible by comparing the intensities of reflected wavelengths.

U.S. Pat. No. 5,581,257 discloses inks having incorporated thin dipoles such as an elongated metals on metallized articles. The dipoles are fixed in targets produced with the ink in a randomly spatial position. The thin dipoles are resonant at radio frequencies in the order of 10 to 100 GHz.

The absorption characteristic of wires relies on passive electromagnetic dipole resonance (antenna resonance), exhibited by electrically conducting wires of a determinate length. A well known law of radio frequency physics teaches that open ended metal wires absorb and radiate electromagnetic energy having a wavelength of twice the wire length (fundamental resonance). Further resonance conditions are fulfilled if an entire multiple of the radiation wavelength corresponds to twice the wire length (higher harmonics). A frequency of 1 GHz corresponds to a wavelength of 30 cm and to a corresponding dipole antenna length of 15 cm, a frequency of 100 GHz has a wavelength of 3 mm and corresponds to a dipole antenna length of 1500 µm and a frequency of 500 GHz requires a dipole antenna length of 300 µm.

The targets disclosed in U.S. Pat. No. '257 do not show resonant characteristics sufficiently reliable and definite for product security, especially when printed as fine lines or dots as it is often the case e.g. on banknotes. In particular when the target is produced with "security" printing techniques such as intaglio, letter-press, offset and silk screen printing the signal characteristics are too low in intensity and over an absorption range too broad and indefinite for a precise and reliable information and in particular for a quick machine readability.

It is the object of the present invention to overcome the drawbacks of the prior art.

In particular it is an object to provide a printing ink printable by the printing processes used for the printing of security documents having incorporated radio frequency responsive means which remain substantially unchanged in their physical aspects throughout the preparation and printing process.

It is a further object of the present invention to provide a document having markings printed thereon which comprise radio-frequency responsive means which lead, upon irradiation with electromagnetic radiation of appropriate frequencies, to precise and analyzable signal characteristics even in case the marking consists of very fine lines or dots.

In a further object of the present invention a flexible security document is to be provided which comprise a marking responsive to radio frequency and resistant to mechanical stress and strain.

It is a further object of the present invention to improve the security aspects of documents carrying radio frequency responsive markings and to provide advanced authentication methods.

These object are solved by the features of the independent claims.

Particularly they are solved by a printing ink which comprises at least one film forming binder and a plurality of at least one type of electrically conductive micro-wires wherein the mean length of said type of micro-wires is in a range of between 3 to 250 µm. Preferably the mean length is in a range of between 5 µm to 100 µm and even more preferably of between 10 µm to 50 µm.

Preferably the length of each individual micro-wire within at least said one type of micro-wires is in a range of +10% to −10% of the mean length of said type. An even better signal characteristic resulting from antenna resonance of the plurality of micro-wires of said one type is obtained by selecting the micro-wires such that the deviation from the mean length is in a range of between +5% to −5%.

The low absorption characteristics of the inks disclosed in U.S. Pat. No. 5,581,257 is due to serious destruction of the wires during the coarse processes of ink preparation and printing. The wires disclosed in U.S. Pat. No. 5,581,257 are in a range of 15 mm to 1.5 mm even preferred are wires of length of 6 mm (¼ inch). It has been found that, due to their length, they are subject to deterioation. In particular grinding processes in the milling machine, often a three-roll-mill, results in notable changes of the original physical wire structure. The ink transfer from the printing plates in intaglio printing to the underlying substrate is performed under a pressure of up to 265 MPa/mm2. Breaking, crumbling, bending and entangling of wires is the answer to those rough conditions. These structure changes are accompanied with a dramatic decrease of the signal characteristic. The demolition of the original wire structure results in an immense number of different wire lengths, i.e. antenna lengths in the printed image, although maybe the deviation of the mean length of the wires employed has been within an acceptable range. The immense number of different lengths results in an immense number of individual antenna resonances when exposed to a continuous spectrum of radio-frequencies. As a result the signals are weak and the spectrum detected is levelled, smooth without discrete signal bands.

It is of importance that the micro-wires of a given type form a homogeneous batch; i.e. they should preferably all have substantially the same diameter, and they should all be cut to substantially the same length within a narrow tolerance. This implies a technological challenge which is generally out of the reach of the common counterfeiter.

Homogeneous wire lengths cannot be obtained by milling of a brittle precursor material of a higher length; a statistical length distribution would merely result. Ductile wires, e.g. aluminum or copper wires, would simply crumple under a milling attempt. Random cutting of longer wires would merely result in a statistical length distribution, too. The only way of making micro-wires having a precise length is by precision cutting on a specifically designed machine. Embedding of longer wires into a rigid matrix, followed by microtome cutting or by machining on an appropriate tool machine, offers a way to obtain micro-wires of the desired precision. The so obtained micro-wires are subsequently freed of their embedding matrix and incorporated into the desired ink or coating composition.

In a first aspect of the present invention micro-wires of a selected range of mean lengths are provided such that the wires are not subject to substantial physical changes during the ink making and printing process. An amplification of the individual antenna resonances to one, more intense signal is the result of individual resonances with only minor deviation in frequency as the answer to electromagnetic radiation of appropriate frequencies.

In another aspect of the present invention also the diameter to length ratio of the micro-wires is chosen such as to guarantee their mechanical stability under the ink making and printing process.

In a preferred embodiment of the present invention the mean diameter of at least said one type of micro-wires is equal or less than 50 μm, more preferably equal or less than 20 μm and even more preferably equal or less than 10 μm. In the case of stainless steel micro-wires, useful diameters are typically about 1 μm to 20 μm for length between 10 μm to 100 μm.

In a further preferred embodiment the concentration of the entirety of the micro-wires can be up to 5% by weight of the total weight of the printing ink. Preferably the entirety consists of only one type of micro-wires being of substantially the same length. However, the entirety can also consist of two or even more types of micro-wires, each type being of substantially the same length. At low concentration, the spectral response signal is approximately proportional to the micro wire concentration. The micro-wires must, however, not touch each other or lie to close to each other; otherwise the individual electric dipoles couple electrically to each other and the generic metallic behaviour (reflectivity) results instead of a sharp resonance. Especially with regard to fine lines and dots printed on security documents the contact between the individual wires will be the more probable the longer each individual wire is. However, a sufficient concentration of wires being of the same length is necessary to give a satisfying response signal. In yet another aspect of the invention the mean length range of the micro-wires with respect to their concentration in the printing ink and printed image has therefore been optimised as well.

The material of at least said one type of micro-wires is preferably chosen such as to withstand the corresponding ink making processes without breaking or crumpling under the sheer forces exerted for example by the three-roll-mills or dispersing equipment. Brittle or highly ductile materials such as metallized glass fibres are therefore excluded. In particular the material of the micro-wires is selected from the group consisting of metals, metal alloys and non conductive materials which comprise at least one layer of an electrically conductive material in a range of 3 to 250 μm. Preferably the metal or metal alloys are selected from the group consisting of copper, copper-alloys, aluminium, aluminium-alloys, iron or stainless steel. They are preferably chemically inert to the components of the printing inks, under the conditions of ink making and printing and under the environmental exposure of the resulting printed item. In this respect particularly useful are copper-nickel-alloys, aluminium-silicon-alloys and stainless steels.

Preferably the material being comprised in the micro-wires is selected so as to provide additional detectable properties, particularly magnetic and/or luminescence properties.

Further part of the present invention is a document and in particular a security document with a first and a second surface having a printed marking on at least one of its surfaces. Said marking comprises a plurality of at least one type of thin micro-wires disposed and fixed in randomly spatial arrangement within said marking, wherein the mean length of said one type of micro-wires is in a range of between 3 μm to 250 μm and the length of each individual micro-wire within said one type is preferably in a range of +10% to −10% of the mean length of said type so as to generate an amplified resonant antenna signal when said marking is exposed to electromagnetic radiation of the appropriate corresponding frequencies.

In a preferred embodiment the mean length of the micro-wires being comprised in said marking is in a range of between 5 μm to 100 μm and even more preferably of between 10 μm to 50 μm. With respect to the deviation from the mean total length, deviations of +5% to −5% are preferred for obtaining a discrete resonant signal.

Part of the present invention is further the use of a plurality of at least one type of micro-wires having a mean length in the range of between 3 μm to 250 μm as antenna in markings which has been printed on security documents wherein the length of each individual micro-wire within said one type of micro-wire preferably is in a range of +10% to −10% of the mean length.

A further advantage of the use of micro-wires of said length selection lies in the fact that micro-wires of said length are not discernable for the human eye. This is a major advantage with respect to security applications since the potential counterfeiter is not aware that a resonant means is incorporated in the marking. Additionally the resonance conditions for micro-wires in a range of between 3 μm to 250 μm corresponds to frequencies of equal or above 1 THz. Those frequencies are very unusual in security applications and need sophisticated detection equipment.

Further part of the present invention is a method for producing a security document having a first and a second surface with at least one marking applied on at least one of said surfaces, said marking comprises a plurality of at least one type of micro-wires fixed in a randomly spatial arrangement, said method comprises the steps of a) subjecting a printing ink comprising at least one film forming binder and a plurality of at least one type of micro-wires to a grinding process in a milling machine and in particular in a three-roll-mill;

b) printing said printing ink obtained after step a) in a printing process selected from intaglio-, offset-, letterpress or silk screen printing processes;

c) Optionally drying said marking wherein the mean length of said type of micro-wire and the material of said type is selected such that the physical structure of the micro-wires is not substantially changed during step a) and step b).

The presence of micro-wires printed on a security document is detectable by various methods. In one embodiment of the present invention the marking is exposed to broad band radiation which can be e.g. generated by a thermal light source, such as a lamp. Such a light source is fitted with corresponding filters and as a detecting device a scanning interferometer is used. The interferometer registers the intensity of the radiation being reflected from the marking. The antenna resonance frequency in said registered spectrum is characterized by its intensity which is lower than in the incident spectrum. This is because the resonant frequency is radiated in all directions by the micro-wire. The spectrum is obtained through Fourier transformation of the measured interferogram.

In order to increase the energy density of the interrogating frequencies to which the micro-wires are exposed excitation by a small band radiation source is preferably applied. Particularly interesting for the production of small band spectra having high energy densities are backward-wave tubes as described by G. Koslov and A. Volkov, in "Millimeter and Sub-Millimeter Wave Spectroscopy of Solids", e.d. G. Grüner, "Topics in applied Physics", Vol. 74, Springer Heidelberg 1998, page 51–111. Backward-wave tubes are tuneable high frequency generators operating as brilliant monochromatic radiation sources in the wavelength range of interest. Combined to small band excitation is a broad band detection.

Alternative approaches for sources generating interrogating small band or broad radiation in the submillimeter domain rely on solid-state devices. In a further embodiment up-converting or down-converting non linear semiconductor devices are used. GaAs and related rapid semiconductor materials permit for example the realisation of tuneable oscillators, and Schottky or MIM diode frequency mixing devices are operated up to the frequency region of interest. Down-converting mixing of the outputs of a tuneable and fixed-frequency diode laser also permits generation of tuneable radiation in the hyper frequency and VFIR domains. Preferably internal mode-mixing in a multi-mode power laser diode is used to generate hyperfrequency radiation in the domains of interest.

In conjunction with a tuneable scanning narrowband radiation source, detection of the corresponding hyperfrequency radiation rely on a broadband thermal detecting (microbolometer or equifunctional) element.

In a further embodiment of the present invention the detecting relies on interferometric or dispersive detecting devices when the micro-wires in the marking are exposed to a broadband radiation source. In the interferometric detection mode a scanning interferometer equipped with a microbolometer or equifunctional detecting element is used. The resulting interferogram is fourier transformed to obtain the absorption spectrum. A narrowband detecting mode relies on a defraction grit or an equifunctional dispersive device. In particular in conjunction with a microbolometer or an equifunctional detecting array. The spectral information is hereby obtained directly.

In a further embodiment of the present invention the marking comprising the micro-wires are exposed to a pulsed excitation with corresponding detection methods.

A further embodiment of the present invention is a detection method which is based on passive detection methods. Passive detection methods take profit of the natural thermal emission of the micro-wires at their resonance frequency which is present at ambient temperature.

In a further embodiment the presence of the micro-wires in the printed marking on a security document is the direct determination of the micro-wires physical and chemical parameters by means of a scanning electron microscope (SEM). Alternatively the determination can be done by scanning the corresponding absorption bands in the spectral domains of interest. Thus by mixing micro-wires of different, well defined mean lengths all within a range of between 3 µm 250 µm, preferably in a range of 5 µm to 100 µm into an ink composition a unique code can be designed. This code is read by SEM or by scanning the corresponding absorption bands in the spectral domains of interest as well. The spectral identification of the encoding makes it suitable for machine reading and authentication. A high number of different codes can be realised through the combination of different precisely defined lengths of a given quality of micro-wires or even of different qualities of micro-wires.

FIG. 1a shows the transmission spectrum (T versus $cm^{-1}$) of a security document comprising a marking having incorporated micro-wires of a mean length of 100 µm in a concentration of 2 weight % of the total weight of the ink.

Figure 1B:
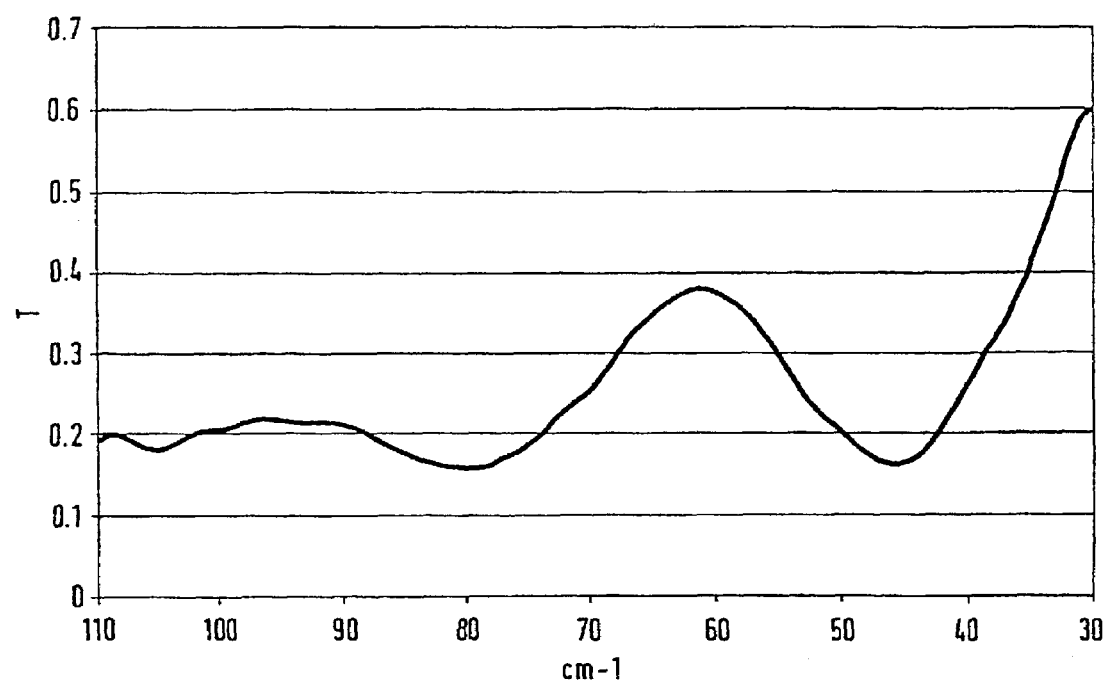

FIG. 1b as FIG. 1a; concentration of micro-wires: 4 weight %.

Figure 1C:
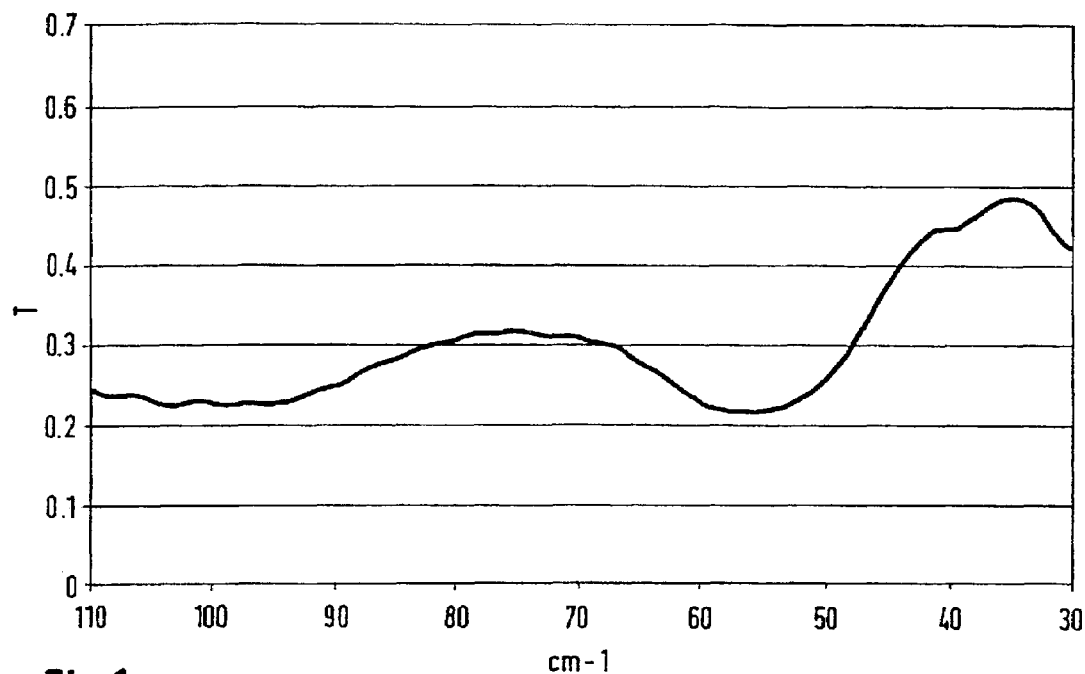

FIG. 1c as FIG. 1a; concentration of micro-wires: 9 weight %.

Figure 1D:
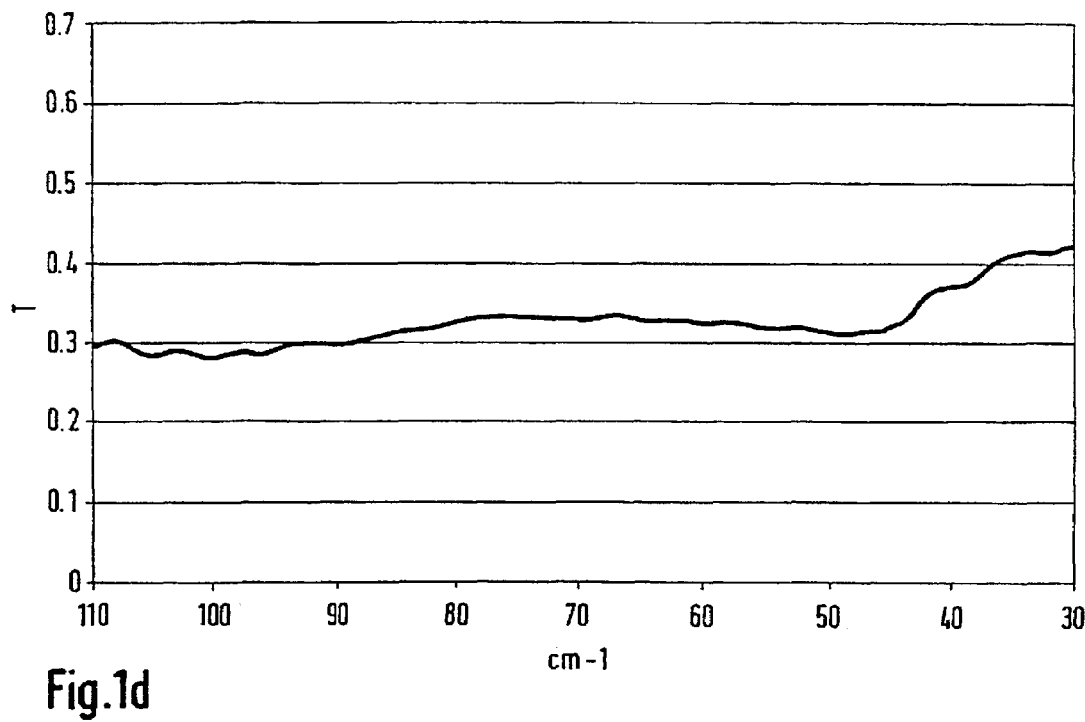

FIG. 1d as FIG. 1a; concentration of micro-wires: 18 weight %.

Figure 2:
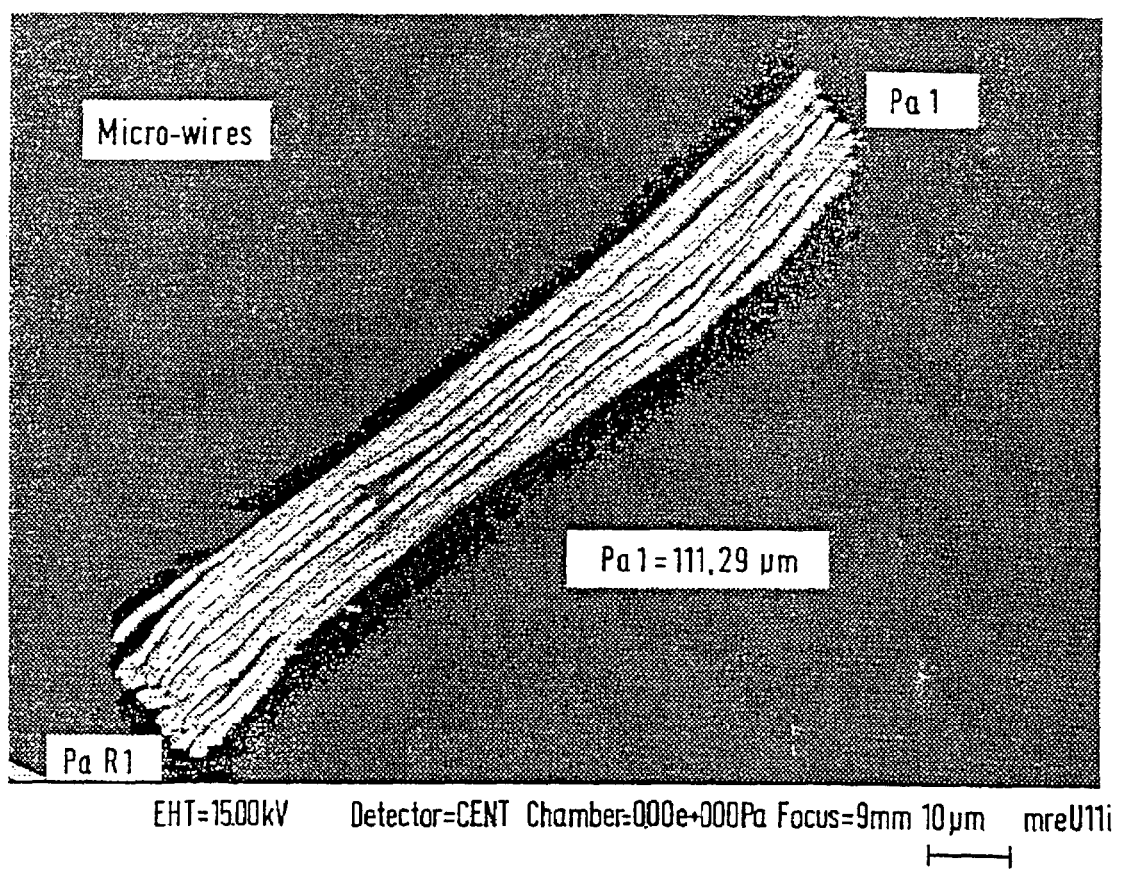

FIG. 2 shows micro wires according to the present invention.

In FIGS. 1a to 1d the VFIR spectra of dried markings having incorporated micro-wires of a mean length of 100 µm were measured in the domain between 100 $cm^{-1}$ to 30 $cm^{-1}$ in diffuse reflectance geometry using a Bruker IFS113v FTIR spectrometer. The figures show that the intensity of the resonance absorption by the micro wires depend on their concentration in the marking. The marking were produced by printing a screen printing ink according to Example 3. Markings were printed on cellulose paper using a 77 T screen in a silk screen printing process.

FIGS. 1a and 1b show an absorption band at about 50 $cm^{-1}$ corresponding to the fundamental dipole resonance of an antenna of 100 µm length. At the higher concentrations of 9 and 18 weight % in FIGS. 1c and 1d the dipole resonance absorption band flattens out and finally disappears completely, due to the high density of micro-wires in the print, which leads to an extensive electric coupling between the individual dipoles, and finally to metallic reflectively. The 18% loaded marking already behaved as a metallic reflector at the wavelengths of interest.

The printing ink in which the micro-wires are incorporated can be any of the known types as long as the components and the dried ink is not detrimental to the micro-wire and its function in the ink. They can be solvent or waterborne. The term "film-forming" is to be understood according to DIN 55945:1996-09.

EXAMPLES

Stainless steel (Fe/Cr) micro-wires of an approximate diameter of 1.5 µm and an approximate length of 100 µm were obtained from N. V. Bekaert S. A., Zwevegem, Belgium. Their appearance is shown in the SEM picture (FIG. 2).

Example 1

Intaglio Ink Containing Micro-Wires as Forensic Marking

An Intaglio ink, as described in EP0340163, was marked with micro-wires according to the following formula:

| | |
|---|---|
| Macromolecular surfactant (EP0340163) | 15 |
| Alkylphenolic tung oil, 80% in oil (EP0340163) | 8 |
| Alkyd resin, 80% in oil (EP0340163) | 10 |
| Sodium sulfonated castor oil, 60% in water | 2 |
| Micronized polyethylene wax | 2 |
| High boiling mineral oil | 3 |
| Pigment Blue 15 | 8 |
| Micro-wires (Bekaert) | 1 |
| Calcium carbonate | 34 |
| Dryer solution (Co, Mn, Zr octoates) | 2 |
| Water (thickened with a cellulose ether) | 15 |
| | 100 |

The ink was printed on currency paper, using an intaglio press. The micro-wires were detected in the printed ink and analyzed with the help of a LEO 438 VP/Oxford ISIS SEM/EDX instrument, using back-scattered electron detection.

Example 2

Offset Ink Containing Micro-Wires

A commercially available offset ink, Pantone Grün 159608 (SICPA Aarberg) was mixed with 5% per weight of micro-wires (Bekaert) on the mill. The viscosity of the resulting product was adjusted to fall into the range of 20–24 Pa.s (25° C., shear rate 500 sec$^{-1}$).

The ink was printed on a "Prüfbau" at 2 g/m$^2$, and analyzed with the help of a LEO 438 VP/Oxford ISIS SEM/EDX instrument, using back-scattered electron detection.

Example 3

Screen Printing Ink Containing Micro-Wires

An unpigmented, solvent based screen printing ink was loaded with different weight percents of micro-wires (Bekaert):

| | Ink 1 | Ink 2 | Ink 3 | Ink 4 |
|---|---|---|---|---|
| Vinylite VAGD | 16 | 15.5 | 15 | 14 |
| Dowanol PMA | 79 | 77 | 73 | 65 |
| Bentone SD-2 | 2 | 2 | 2 | 2 |
| TEGO Airex 980 | 1 | 1 | 1 | 1 |
| Micro-wires (Bekaert) | 2 | 4.5 | 9 | 18 |
| | 100 | 100 | 100 | 100 |

Patches of these inks were printed on cellulose paper, using a 77T screen, and the micro-wire density was checked on the SEM.

Furthermore, the VFIR spectra of the dried ink patches in the domain between 110 cm$^{-1}$ to 30 cm$^{-1}$ were measured in diffuse reflectance geometry, using a Bruker IFS113v FTIR spectrometer. The obtained spectra are given in FIGS. 1a, 1b, 1c and 1d.

We claim:

1. A printing ink comprising at least one film forming binder—and a plurality of at least one type of electrically conductive micro-wires wherein said micro-wires are separated from each other such that they do not touch each other and thereby act as individual electric dipoles and wherein the mean length of said type of micro-wires is in a range of between 3 µm to 250 µm.

2. Printing ink according to claim 1 wherein the mean length of the micro-wires is in a range of between 5 µm to 100 µm.

3. Printing ink according to claim 1 wherein the mean length of the micro-wires is in a range of between 10 µm to 50 µm.

4. Printing ink according to claim 1 wherein the length of each micro-wire within at least said one type of micro-wires is in a range of +10% to −10% of the mean length.

5. Printing ink according to claim 4 wherein the length of each micro-wire within at least said one type of micro-wires is in a range of between +5% to −5% of the mean length.

6. Printing ink according to claim 1 wherein the mean diameter of at least said one type of micro-wires is equal or less than 50 µm.

7. Printing ink according to claim 6 wherein the mean diameter of at least said one type of micro-wires is equal or less than 20 µm.

8. Printing ink according to claim 6 wherein the mean diameter of at least one type of micro-wires is equal or less than 10 µm.

9. Printing ink according to claim 1 wherein the material of at least said one type of micro-wires is selected from the group consisting of metals, metal-alloys and non conductive materials comprising at least one layer of an electrically conductive material, the layer having a thickness in the range of 3 µm to 250 µm.

10. Printing ink according to claim 9 wherein the metal or metal-alloy are selected from the group consisting of copper, copper-alloys, aluminum, aluminum-alloys and stainless steels.

11. Printing ink according to claim 1 wherein the material of said one type of micro-wires is selected so as to have additional detectable properties, particularly magnetic and/or luminescence properties.

12. A method of use of at least one type of micro-wire having a mean length of between 3 µm to 250 µm as antennas in markings which have been printed on security documents wherein said micro-wires are separated from each other such that they do not touch each other and thereby act as individual electric dipoles and the length of each individual micro-wire within said one type of micro-wire preferably is in a range of +10% to −10% of the mean length.

13. Document, in particular a security document, with a first and a second surface having a printed marking on at least one of its surfaces, said marking comprising a plurality of at least one type of thin micro-wires fixed in a randomly spatial arrangement within said marking, wherein said micro-wires are separated from each other such that they do not touch each other and thereby act as individual electric dipoles, the mean length of said one type of micro-wires is in a range of between 3 µm to 250 µm and the length of each micro-wire within said one type of micro-wire is preferably in a range of +10% to −10% of the mean length of said one type so as to generate an amplified resonant antenna signal when said marking is exposed to electromagnetic radiation having frequencies corresponding to the micro-wires length.

14. A method for producing a security document having a first and a second surface with at least one marking applied on at least one of said surfaces said marking comprises a plurality of at least one type of micro-wires fixed in a randomly spatial arrangement, said method comprising steps of a) subjecting a printing ink comprising at least one film forming binder and a plurality of at least one type of electrically conductive micro-wires, wherein said micro-wires are separated from each other such that they do not touch each other and thereby act as individual electric dipoles and wherein the mean length of said type of micro-wires is in a range of between 3 μm to 250 μm, to a grinding process in a milling machine and in particular in a three-roll-mill;

b) printing said printing ink obtained after step a) in a printing process selected from intaglio-, offset-, letterpress or silk screen printing processes; and c) optionally drying said marking;

wherein the material of said one type of micro-wires is selected such that the physical structure of the micro-wires is not substantially changed during step a) and step b).

15. A method for authentication of a security document with at least a first and a second surface having a printed marking on at least one of its surfaces, said marking comprising a plurality of at least one type of thin micro-wires fixed in a randomly spatial arrangement within said marking, wherein said micro-wires are separated from each other, the mean length of said one type of micro-wires is in a range of between 3 μm to 250 μm and the length of each micro-wire within said one type of micro-wire is preferably in a range of +10% to −10% of the mean length of said one type, said method comprising the steps of a) exposing said marking to a narrowband radiation, in particular produced by a tunable backward-wave tube, and b) detecting the spectrum coming from the marking by a broadband detecting element.

16. A method for authentication of a security document with at least a first and a second surface, said security document having a printed marking on at least one of its surfaces, said marking comprising a plurality of at least one type of thin micro-wires fixed in a randomly spatial arrangement within said marking, wherein said micro-wires are separated from each other, the mean length of said one type of micro-wires is in a range of between 3 μm to 250 μm and the length of each micro-wire within said one type of micro-wire is preferably in a range of +10% to −10% of the mean length of said one type, said method comprising the steps of a) exposing said marking to a broadband radiation, in particular produced by a thermal light source, and b) detecting the spectrum coming from the marking by a narrowband detecting element or by a scanning interferometer.

17. A method for authentication of a security document having a first and a second surface with a printed marking on at least one of said surfaces, said marking comprising a plurality of at least one type of thin micro-wires fixed in a randomly spatial arrangement within said marking, wherein said micro-wires are separated from each other such that they do not touch each other and thereby act as individual electric dipoles, the mean length of said one type of micro-wires is in a range of between 3 μm to 250 μm and the length of each micro-wire within said one type of micro-wire is preferably in a range of +10% to −10% of the mean length of said one type so as to generate an amplified resonant antenna signal when said marking is exposed to electromagnetic radiation having frequencies corresponding to the micro-wires length, wherein the physical and/or chemical parameters are detected by a scanning electron microscope (SEM/EDX).

18. A method for authentication of a security document with at least a first and a second surface having a printed marking on at least one of its surfaces, said marking comprising a plurality of at least one type of thin micro-wires fixed in a randomly spatial arrangement within said marking, wherein said micro-wires are separated from each other such that they do not touch each other and thereby act as individual electric dipoles, the mean length of said one type of micro-wires is in a range of between 3 μm to 250 μm and the length of each micro-wire within said one type of micro-wire is preferably in a range of +10% to −10% of the mean length of said one type, wherein the natural thermal emission of said micro-wires is detected at their resonance frequency by passive detection methods.

* * * * *